United States Patent
Ishizu

(10) Patent No.: US 9,408,074 B2
(45) Date of Patent: Aug. 2, 2016

(54) AUTHENTICATION SYSTEM, ELECTRONIC DEVICE, AND AUTHENTICATION METHOD

(71) Applicant: KYOCERA DOCUMENT SOLUTIONS INC., Osaka (JP)

(72) Inventor: Ryuichi Ishizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 107 days.

(21) Appl. No.: 14/280,842

(22) Filed: May 19, 2014

(65) Prior Publication Data

US 2014/0359737 A1    Dec. 4, 2014

(30) Foreign Application Priority Data

May 28, 2013 (JP) ................................. 2013-112371

(51) Int. Cl.
| | |
|---|---|
| *H04W 12/06* | (2009.01) |
| *H04L 29/06* | (2006.01) |
| *G06F 21/34* | (2013.01) |
| *G06F 21/35* | (2013.01) |

(52) U.S. Cl.
CPC ............ *H04W 12/06* (2013.01); *G06F 21/34* (2013.01); *H04L 63/0853* (2013.01); *H04L 63/10* (2013.01); *H04L 63/107* (2013.01); *G06F 21/35* (2013.01)

(58) Field of Classification Search
CPC ... H04L 63/0853; H04L 65/10; H04L 65/107; H04W 12/06; G06F 21/34; G06F 21/35
See application file for complete search history.

(56) References Cited

U.S. PATENT DOCUMENTS

| | | | | |
|---|---|---|---|---|
| 6,563,430 | B1 * | 5/2003 | Kemink | H04N 21/42202 340/12.22 |
| 8,806,039 | B2 * | 8/2014 | Coffy | H04W 4/001 340/539.23 |
| 2005/0066179 | A1 * | 3/2005 | Seidlein | G06Q 20/32 713/182 |

(Continued)

FOREIGN PATENT DOCUMENTS

| | | |
|---|---|---|
| JP | 2003-186848 A | 7/2003 |
| JP | 2013-021675 A | 1/2013 |

OTHER PUBLICATIONS

An Office Action; "Notice of Reasons for Rejection," issued by the Japanese Patent Office on Jul. 21, 2015, which corresponds to Japanese Patent Application No. 2013-112371 and is related to U.S. Appl. No. 14/280,842.

*Primary Examiner* — Jung Kim
*Assistant Examiner* — Ngoc D Nguyen
(74) *Attorney, Agent, or Firm* — Studebaker & Brackett PC

(57) ABSTRACT

An authentication system includes one or more portable terminals and an electronic device. The electronic device includes a storage section, a terminal location acquiring section, a determining section, an authentication section, and a right granting section. The storage section stores authentication information of each of one or more users, usage right information of each user, and location information of the electronic device. The terminal location acquiring section acquires location information of each portable terminal. The determining section determines a first portable terminal that is located within a specific authentication distance from the electronic device, based on the location information. The authentication section performs authentication of a first user associated with the first portable terminal, based on the authentication information of the first user. The right granting section permits the first user to use the electronic device within a scope of usage right granted to the first user.

6 Claims, 9 Drawing Sheets

(56) References Cited

U.S. PATENT DOCUMENTS

2008/0233971 A1* 9/2008 Panabaker ............ G01S 5/0247
  455/456.1
2009/0204815 A1* 8/2009 Dennis ................ H04L 63/1416
  713/168
2010/0210210 A1* 8/2010 Panabaker ............ G01S 5/0247
  455/41.2

* cited by examiner

AUTHENTICATION SYSTEM, ELECTRONIC DEVICE, AND AUTHENTICATION METHOD

INCORPORATION BY REFERENCE

The present application claims priority under 35 U.S.C. §119 to Japanese Patent Application No. 2013-112371, filed May 28, 2013. The contents of this application are incorporated herein by reference in their entirety.

BACKGROUND

The present disclosure relates to authentication systems, electronic devices, and authentication methods all of which are for user authentication.

Image forming apparatuses, such as digital multifunction peripherals, are a type of typical electronic devices. It is often the case where one image forming apparatus is shared among a plurality of users. When an image forming apparatus is shared among a plurality of users, each user is permitted to use the image forming apparatus within the scope of the usage right granted to that user. Such an image forming apparatus performs user authentication. Then, successfully authenticated users are permitted to use the image forming apparatus within the scope of their respective usage rights.

When authentication of a user is performed, the user is required to input authentication information, such as a user ID or a password, to the image forming apparatus. This, however, may reduce user convenience.

SUMMARY

According to an aspect of the present disclosure, an authentication system includes one or more portable terminals and an electronic device. The electronic device includes a storage section, a terminal location information acquiring section, a terminal determination section, a user authentication section, and a right granting section. The storage section stores: authentication information of one or more users each associated with one of the one or more portable terminals; usage right information indicating a usage right granted to each of the one or more users; and location information of the electronic device. The terminal location information acquiring section acquires location information of each of the one or more portable terminals. The terminal determiner determines from among the one or more portable terminals a first portable terminal that is located within a specific authentication distance from the electronic device, based on the location information of each of the one or more portable terminals and the location information of the electronic device. The user authentication section performs of authentication of a first user associated with the first portable terminal, based on the authentication information of the first user. The right granting section permits the first user to use the electronic device within a scope of usage right granted to the first user.

According to another aspect of the present disclosure, an electronic device includes a storage section, a terminal location information acquiring section, a terminal determination section, a user authentication section, and a right granting section. The storage section stores: authentication information of one or more users each associated with one of the one or more portable terminals; usage right information indicating a usage right granted to each of the one or more users; and location information of the electronic device. The terminal location information acquiring section acquires location information of each of the one or more portable terminals. The terminal determining section determines from among the one or more portable terminals a first portable terminal that is located within a specific authentication distance from the electronic device, based on the location information of each of the one or more portable terminals and the location information of the electronic device. The user authentication section performs authentication of a first user associated with the first portable terminal, based on the authentication information of the first user. The right granting section permits the first user to use the electronic device within a scope of usage right granted to the first user.

According to a yet another aspect of the present disclosure, an authentication method is for performing user authentication by an electronic. The electronic device includes a storage section that stores: authentication information of one or more users each associated with one of the one or more portable terminals; usage right information indicating a usage right granted to each of the one or more users; and location information of the electronic device. The authentication method includes a first step, a second step, a third step, and a fourth step. The first step is a step of acquiring location information of each of the one or more portable terminals. The second step is a step of determining from among the one or more portable terminals a first portable terminal that is located at a distance within a specific authentication distance from the electronic device, based on the location information of each of the one or more portable terminals and the location information of the electronic device. The third step is a step of performing authentication of a first user associated with the first portable terminal, based on the authentication information of the first user. The fourth step is a step of permitting the first user to use the electronic device within a scope of usage right granted to the first user.

DETAILED DESCRIPTION

An electronic device according to the present embodiment determines a portable terminal that is located within an authentication distance based on location information of the portable terminal, and performs user authentication based on authentication information associated with the determined portable terminal The electronic device then permits the authenticated user to use the electronic device within the scope of the usage right granted to that user. This improves user convenience in the user authentication performed by the electronic device. Note that the electronic device is not particularly limited and may be an image forming apparatus, for example.

The following describes the present disclosure by way of several examples, with reference to the accompanying drawings.

EXAMPLE 1

Figure 1:
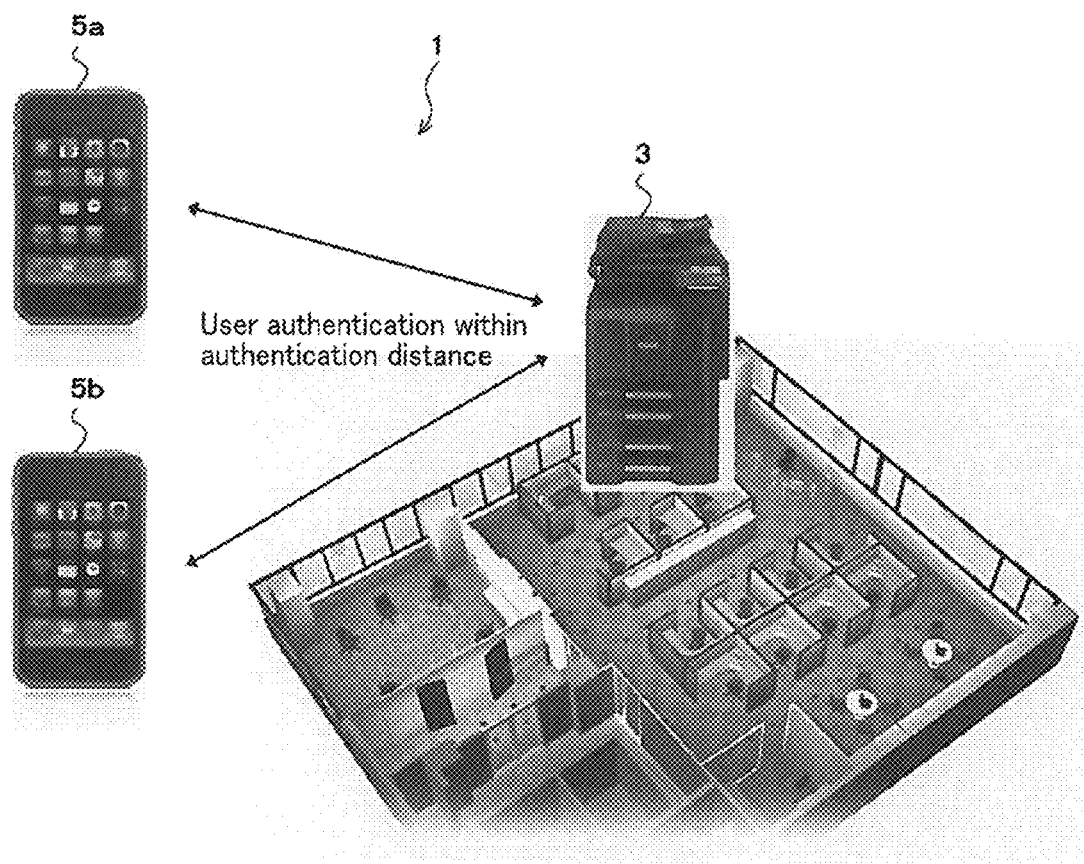
FIG. 1 shows an overview of an authentication system according to Example 1.
Figure 2:
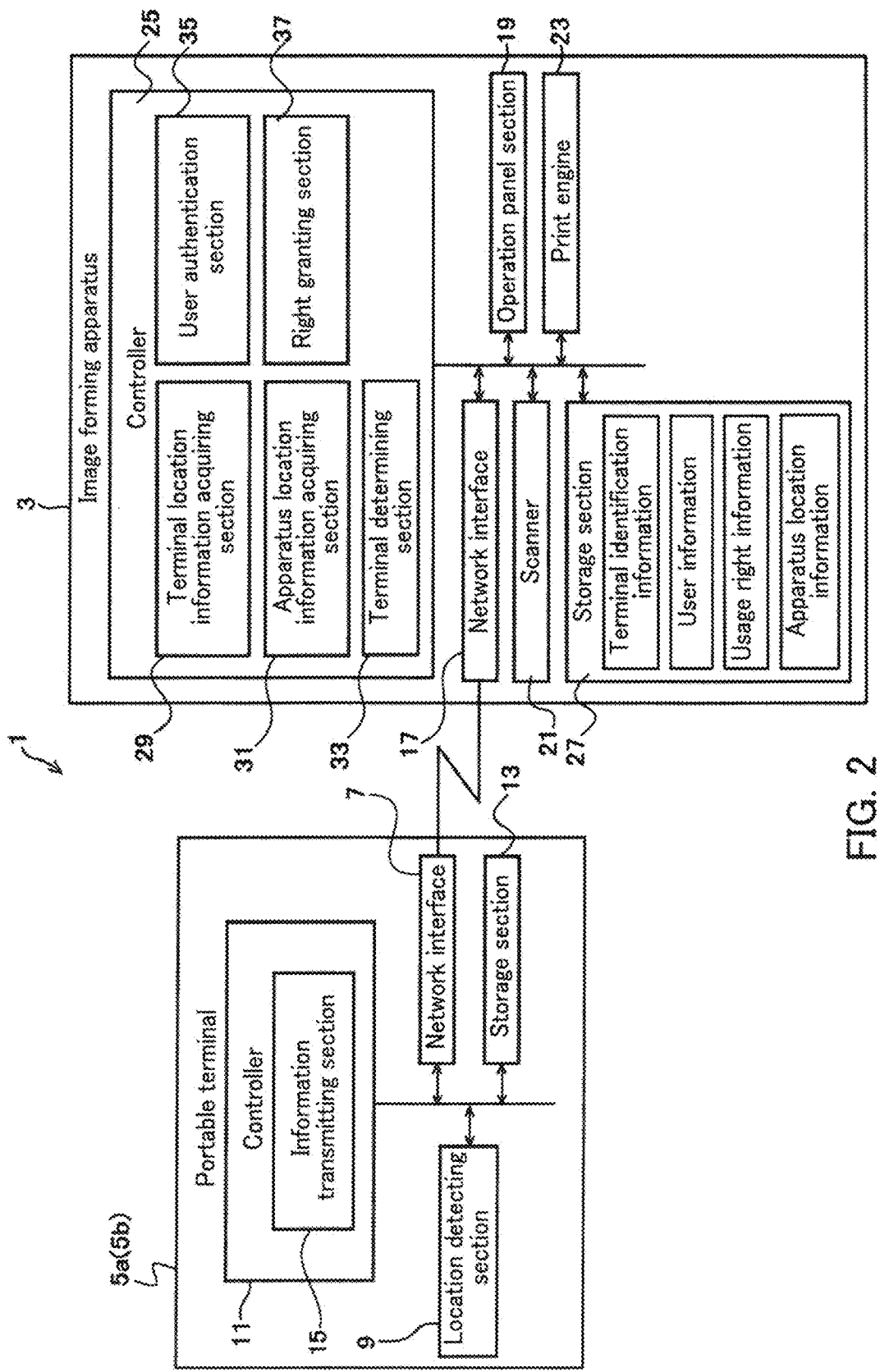
FIG. 2 shows a configuration the authentication system according to Example 1.

FIG. 1 shows an overview of an authentication system according to Example 1. FIG. 2 shows a configuration of the authentication system according to Example 1.

As shown in FIGS. 1 and 2, the authentication system 1 includes an image forming apparatus 3 and one or more portable terminals (two portable terminals 5a and 5b in Example 1). The authentication system 1 performs user authentication to authenticate a user of the portable terminal 5a or 5b when the portable terminal 5a or 5b owned by the user is located within a specific authentication distance from the image forming apparatus 3. The authentication system 1 then permits the authenticated user to use the image forming apparatus 3 within the scope of the usage right granted to that user. The authentication distance is not particularly limited and may, for example, be equal to or slightly longer than the distance from the image forming apparatus 3 to a user operating the image forming apparatus 3.

Each of the portable terminals 5a and 5b is, for example, a portable information processing terminal, such as a multifunction mobile phone. As shown in FIG. 2, each of the portable terminals 5a and 5b includes a network interface 7, a location detecting section 9, a controller 11, and a storage section 13.

The network interface 7 is a device for data transmission to and from external devices, including the image forming apparatus 3, via a communication network.

The location detecting section 9 is a device for detecting the location (coordinates) of the corresponding portable terminal 5a or 5b, by using the Global Positioning System (GPS), for example.

The controller 11 is an arithmetic device that includes, for example, a central processing unit (CPU) and executes a program to control the respective sections or to cause the respective sections to carry out some operations.

The storage section 13 includes, for example, a read-only memory (ROM) storing an operation program and the like, a random access memory (RAM) as a work area, and a secondary storage section. The secondary storage section is a flash memory or a hard disk drive (HDD), for example.

In Example 1, the controller 11 functions as an information transmitting section 15 by executing an application program for authentication (authentication application) that is stored in the storage section 13.

The information transmitting section 15 implements an information transmitting function. At a request form the image forming apparatus 3, the information transmitting section 15 transmits terminal location information indicating its own location (coordinates) detected by the location detecting section 9 to the image forming apparatus 3. Together with the terminal location information, the information transmitting section 15 transmits terminal identification information identifying its own portable terminal 5a or 5b. For example, the terminal identification information is an Internet Protocol (IP) address, or the like.

The image forming apparatus 3 is, for example, a digital multifunction peripheral and includes a network interface 17, an operation panel section (operation input section) 19, a scanner 21, a print engine 23, a controller 25, and a storage section 27.

The network interface 17 is a device for data transmission to and from external devices, including the portable terminals 5a and 5b, via a communication network.

The operation panel section 19 is a device that receives operation inputs to the image forming apparatus 3 and displays the operational status. The operation panel section 19 is a keyboard and/or a touch panel. Operation inputs may be general operation inputs that require no user authentication, or authentication-requiring operation inputs that require user authentication.

Figure 3A:
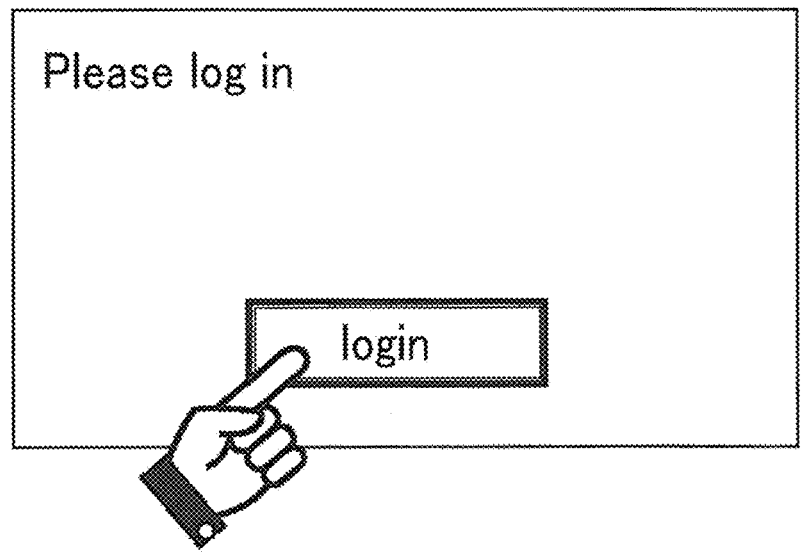
FIG. 3A shows an example of a login screen.
Figure 3B:
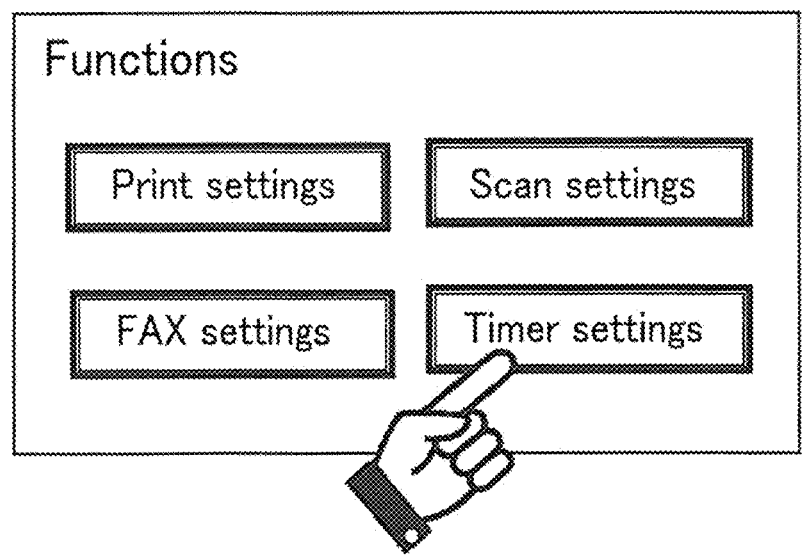
FIG. 3B shows an example of a selection screen.

For example, authentication-requiring operation inputs are inputs for login to the image forming apparatus 3 or for various settings. When an authentication-requiring operation input is received, the image forming apparatus 3 performs user authentication. FIGS. 3A and 3B each show an example screen for making an authentication-requiring operation input. FIG. 3A shows an example of a login screen, whereas FIG. 3B shows an example of a selection screen.

The scanner 21 reads an original document to generate image data.

The print engine 23 forms an image on paper based on the image data that is generated by the scanner 21 or received from an external device via the network interface.

The controller 25 is an arithmetic device that includes, for example, a central processing unit (CPU) and executes a program to control the respective sections or to cause the respective sections to carry out some operations.

The storage section 27 includes, for example, a read only memory (ROM) storing an operation program and the like, a random access memory (RAM) as a work area, and a secondary storage section. The secondary storage section is a flash memory or a hard disk drive (HDD), for example.

The storage section 27 of Example 1 stores user information of the users each associated with either the portable terminal 5a or 5b. More specifically, the storage section 27 associatively stores terminal identification information of each of the portable terminals 5a and 5b and user information of the user who owns the corresponding portable terminal 5a or 5b. Each piece of user information at least includes authentication information, such as a user ID, and usage right information indicating the scope of usage right, that is the scope of operation inputs permitted for the corresponding user. The storage section 27 also stores apparatus location information indicating the installation location of the image forming apparatus 3.

The user information and the apparatus location information may be registered in advance through operation inputs on the operation panel section 19, for example. Note that the user information and the apparatus location information may be stored on a server. Alternatively, the apparatus location information may be acquired by the image forming apparatus 3 by detecting its own location by using GPS or the like.

The storage section 27 stores an authentication program. By executing the authentication program, the controller 25 functions as a terminal location information acquiring section 29, an apparatus location information acquiring section (device location information acquiring section) 31, a terminal determining section 33, a user authentication section 35, and a right granting section 37.

The terminal location information acquiring section 29 implements the function of acquiring terminal location information and acquires pieces of terminal location information indicating the respective locations of the portable terminals 5a and 5b. In Example 1, the terminal location information acquiring section 29 acquires the respective pieces of terminal location information from the portable terminal 5a and 5b in response to an authentication-requiring operation input on the operation panel section 19.

The apparatus location information acquiring section 31 implements the function of acquiring device location information and acquires the apparatus location information of the image forming apparatus 3. In Example 1, the apparatus location information acquiring section 31 acquires the apparatus location information of the image forming apparatus 3 from the storage section 27 in response to an authentication-requiring operation input on the operation panel section 19.

The terminal determining section 33 implements the function of terminal determination and determines, from among the portable terminals 5a and 5b, a portable terminal that is located at a distance equal to or shorter than the authentication distance from the image forming apparatus 3, based on the respective pieces of terminal location information of the portable terminals 5a and 5b and the apparatus location information of the image forming apparatus 3. That is, the terminal determining section 33 determines a portable terminal located within the authentication distance (in-authentication-distance terminal) from among the portable terminals 5a and 5b.

In Example 1, the terminal determining section 33 performs the determination of an in-authentication-distance terminal after the apparatus location information acquiring section 31 acquires the apparatus location information and the terminal location information acquiring section 29 acquires the respective pieces of terminal location information.

The user authentication section 35 implements the function of user authentication and authenticates, based on the authentication information, the user associated with the portable terminal 5a or 5b that is determined as an in-authentication-distance terminal by the terminal determining section 33. More specifically, the user authentication section 35 acquires from the storage section 27 a piece of user information that is stored in association with the piece of terminal identification information of the portable terminal 5a or 5b that is determined as an in-authentication-distance terminal Then, the user authentication section 35 performs authentication of the user of the portable terminal that is determined as an in-authentication-distance terminal, based on the authentication information included in the acquired piece of user information.

The right granting section 37 implements the function of granting a usage right and permits the authenticated user to use the image forming apparatus 3 within the scope of the usage right granted to that user, based on the usage right information.

Figure 4:
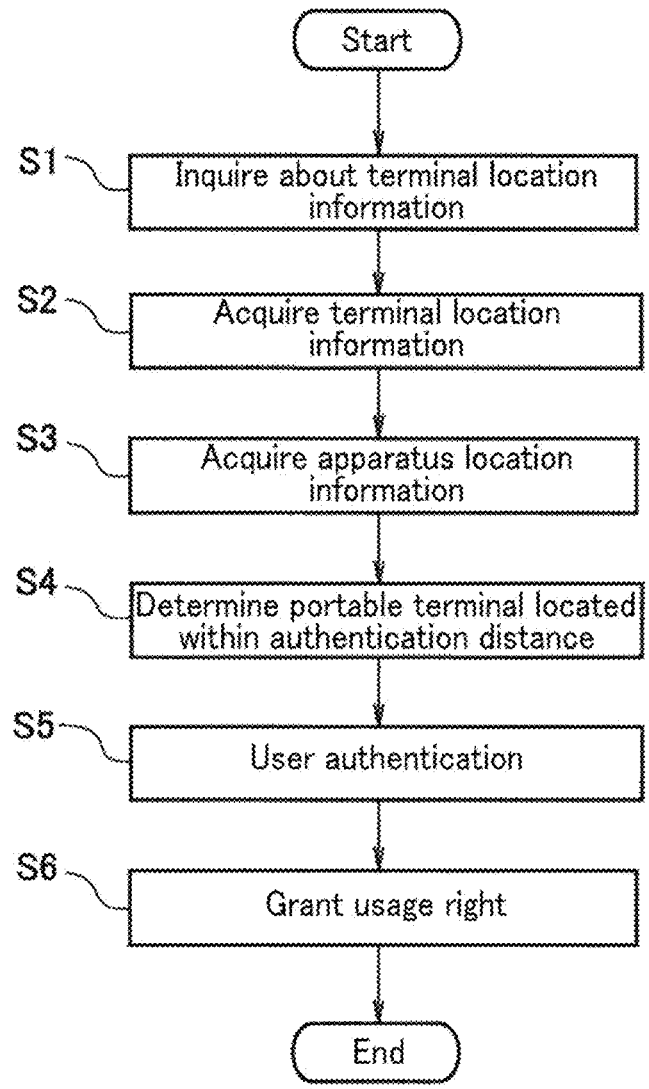
FIG. 4 shows a flow of an authentication process according to Example 1.
Figure 5:
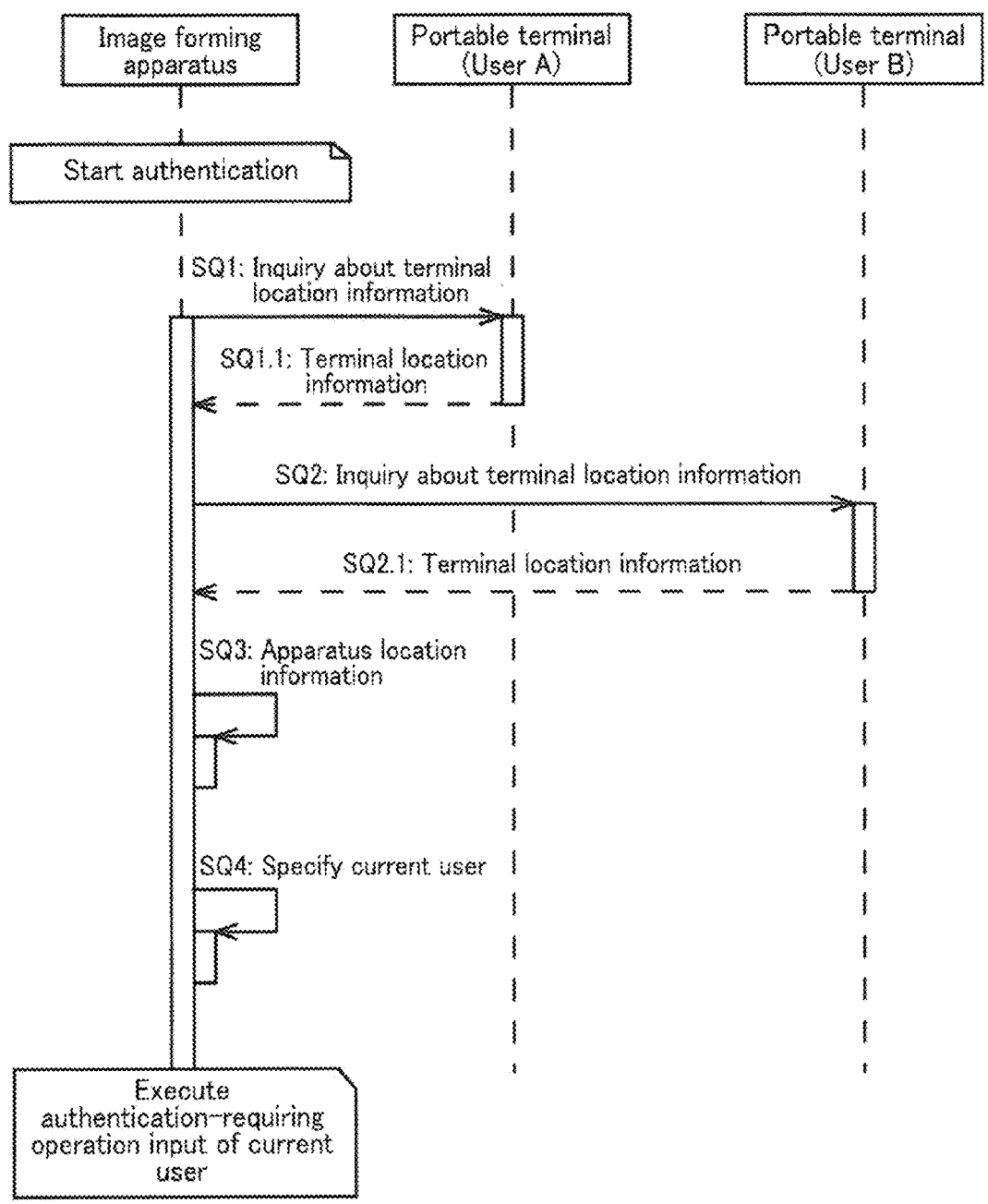
FIG. 5 shows a sequence of the authentication process according to Example 1.

FIG. 4 shows a flow of an authentication process according to Example 1. FIG. 5 shows a sequence of the authentication process according to Example 1.

The authentication process of Example 1 starts in response to an authentication-requiring operation input on the login screen shown in FIG. 3A or on the selection screen shown in FIG. 3B. In advance of the authentication process, an authentication application is executed on the portable terminal 5a or 5b owned by the user who intends to make an operation input to the image forming apparatus 3.

As shown in FIG. 4, the controller 25 first makes an inquiry about the terminal location information to each of the portable terminals 5a and 5b (Step S1). In the processing of Step S1, the terminal location information acquiring section 29 of the image forming apparatus 3 makes an inquiry about the terminal location information to each of the portable terminals 5a and 5b (users A and B, respectively) in response to an authentication-requiring operation input on the operation panel section 19, as indicated by SQ1 and SQ2 in FIG. 5.

For example, the terminal location information acquiring section 29 issues an acquisition request for terminal location information to each of the portable terminals 5a and 5b of which the terminal identification information stored in the storage section 27 of the image forming apparatus 3. Yet, it is not necessary to issue an acquisition request to all of the portable terminals 5a and 5b of which the terminal identification information stored in the storage section 27. For example, the terminal location information acquiring section 29 may issue an acquisition request only to a portable terminal that is owned by a user permitted to make authentication-requiring operation inputs.

Next, the controller 25 acquires the terminal location information (Step S2). In Step S2, in response to the acquisition request from the image forming apparatus 3, the information transmitting section 15 of each of the portable terminals 5a and 5b transmits the terminal location information and terminal identification information of the corresponding portable terminal 5a or 5b to the image forming apparatus 3, as indicated by SQ1.1 and SQ2.1 in FIG. 5. Then, the terminal location information acquiring section 29 of the image forming apparatus 3 receives the respective pieces of terminal location information and the respective pieces of terminal identification information of the portable terminals 5a and 5b. Note that the image forming apparatus 3 does not receive the terminal location information and the terminal identification information from any portable terminal on which an authentication application has not been executed.

Thereafter, the controller 25 acquires the apparatus location information of the image forming apparatus (Step S3). In the processing of Step S3, the apparatus location information acquiring section 31 of the image forming apparatus 3 acquires the apparatus location information of the image forming apparatus 3 from the storage section 27, as indicated by SQ3 in FIG. 5.

Thereafter, the controller 25 determines an in-authentication-distance terminal (Step S4). In the processing of Step S4, the terminal determining section 33 of the image forming apparatus 3 determines an in-authentication-distance terminal that is a portable terminal 5a or 5b located within the authentication distance from the image forming apparatus 3 based on the acquired pieces of terminal location information of the portable terminals 5a and 5b and the acquired apparatus location information of the image forming apparatus 3.

By this determination, the image forming apparatus 3 can specify that the user of the in-authentication-distance terminal is the one who made the authentication-requiring operation input to the image forming apparatus 3 (current user), as indicated by SQ4 in FIG. 5.

Thereafter, the controller 25 performs user authentication (Step S5). In the processing of Step S5, the user authentication section 35 of the image forming apparatus 3 performs authentication of the current user, that is the user associated with the in-authentication-distance terminal determined in Step S4, based on the authentication information of the current user.

Thereafter, the controller 25 grants the usage right to the current user (Step S6). In the processing of Step S6, the right granting section 37 of the image forming apparatus 3 grants the usage right for the image forming apparatus 3 to the current user based on the usage right information stored in the storage section 27. In other words, the right granting section 37 permits the current user to use the image forming apparatus 3 within the scope of the usage right granted to that user.

As a consequence, the current user is enabled to have authentication-requiring operation inputs executed within the scope of the usage right granted to that user. Upon receipt of a login operation on the login screen shown in FIG. 3A, the login operation is completed, which enables the current user to use the image forming apparatus 3 within the scope of the usage right. Upon receipt of a selection operation on the selection screen shown in FIG. 3B, the selection operation input by the current user is approved according to the usage right, which enables the current user to operate the selected settings. When the selected settings fall outside the usage right granted to the current user, the selection operation input will not be approved and the current user is not permitted to operate the relevant settings. Thereafter, the controller 25 ends the authentication process.

As described above, the authentication system 1 according to Example 1 includes the one or more portable terminals 5a and 5b and the image forming apparatus 3 that performs user authentication. The image forming apparatus 3 includes the storage section 27, the terminal location information acquiring section 29, the terminal determining section 33, the user authentication section 35, and the right granting section 37. The storage section 27 stores: authentication information of one or more users each associated with one of the one or more portable terminals 5a and 5b ; usage right information indicating the usage right granted to each of the one or more users; and location information of the image forming apparatus 3. The terminal location information acquiring section 29 acquires location information indicating the location of each of the one or more portable terminals 5a and 5b. The terminal determining section 33 determines, from among the one or more portable terminals 5a and 5b, a portable terminal located within the specific authentication distance from the image forming apparatus 3 (a first portable terminal). The user authentication section 35 authenticates the user associated with the determined portable terminal 5a or 5b (a first user) based on the authentication information of that user. The right granting section 37 then permits the authenticated user to use the image forming apparatus 3 within the scope of the usage right granted to the user.

Consequently, the image forming apparatus 3 of Example 1 can authenticate the user of the portable terminals 5a and 5b that is located within the authentication distance from the image forming apparatus 3, without the need for the user to input authentication information. In addition, the authenticated user can use the image forming apparatus 3 within the scope of the usage right granted to that user. In this way, convenience of the users of the image forming apparatus 3 improves with respect to user authentication.

In addition, in the authentication system 1 according to Example 1, the image forming apparatus 3 includes the operation panel section 19 for receiving operation inputs and the terminal determining section 33 performs the determination about the portable terminals 5a and 5b when an operation input requiring user authentication is received.

Consequently, according to Example 1, the image forming apparatus 3 can determine the portable terminal 5a or 5b that is owned by the current user and permits the current user to use the image forming apparatus 3 according to the appropriate usage right.

The authentication system 1 according to Example 1 may be implemented as an internal system of the image forming apparatus 3. In such a case, the configuration of the authentication system 1 may be simplified.

EXAMPLE 2

Figure 6:
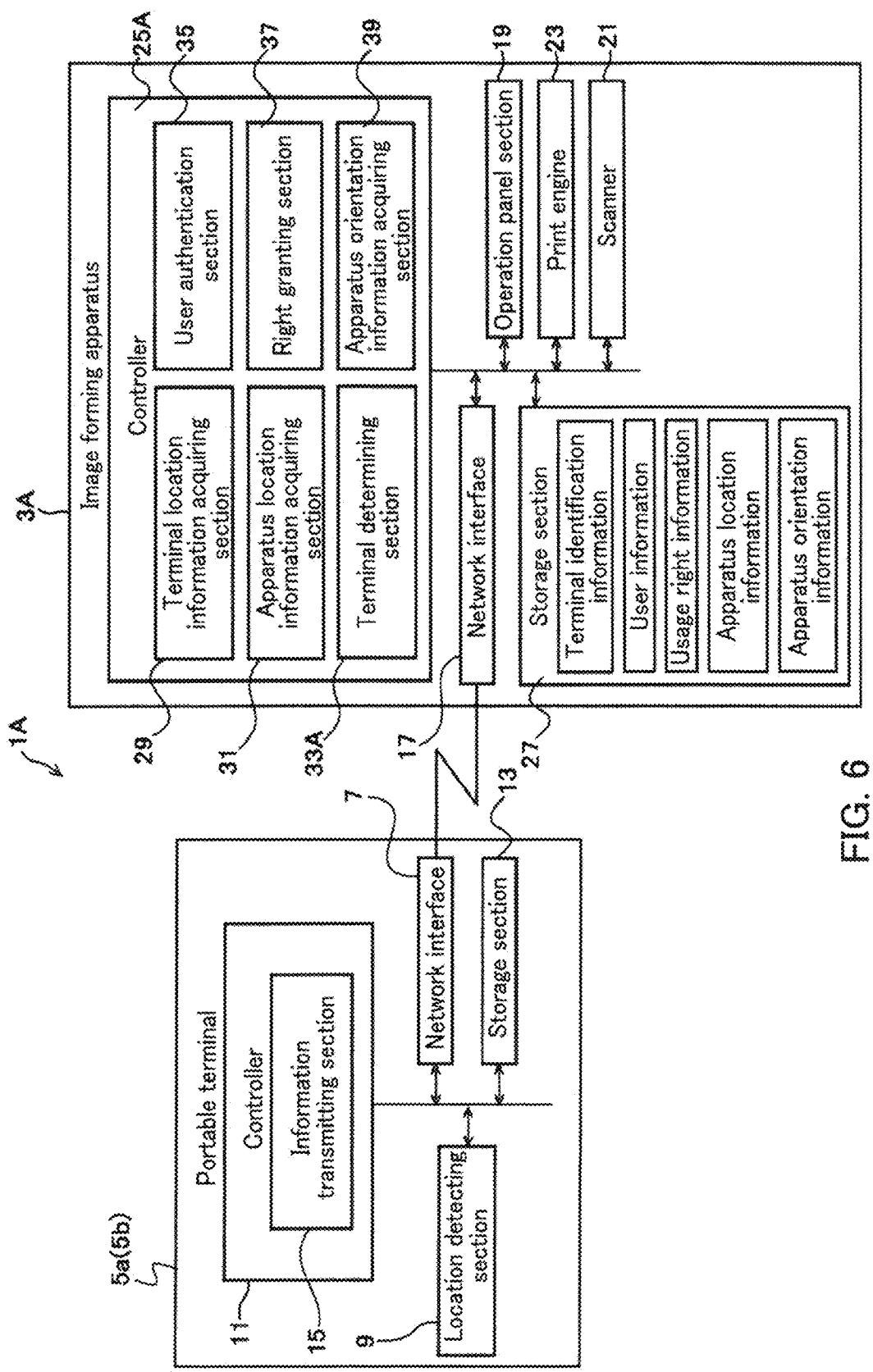
FIG. 6 shows a configuration of an authentication system according to Example 2.

FIG. 6 shows a configuration of an authentication system according to Example 2. In FIG. 6, component parts that are common with Example 1 are denoted by the same reference signs or those appended with the letter A. In addition, explanations of such common component parts are omitted where appropriate.

When a plurality of in-authentication-distance terminals 5a and 5b exist, an image forming apparatus 3A according to Example 2 specifies which of the portable terminals 5a and 5b is the one owned by the user actually operating the image forming apparatus 3A. The specification of the portable terminal 5a or 5b is performed by a terminal determining section 33A of the image forming apparatus 3A, for example. In Example 2, a controller 25A of the image forming apparatus 3A also functions as an apparatus orientation information acquiring section (device orientation information acquiring section) 39.

The apparatus orientation information acquiring section 39 implements the function of acquiring device orientation information and acquires apparatus orientation information indicating the orientation of the image forming apparatus 3A. The apparatus orientation information is stored in a storage section 27.

The apparatus orientation information may be registered in advance through operation inputs on an operation panel section 19, for example. Note that the apparatus orientation information may be stored on a server. Alternatively, the apparatus orientation information may be acquired by the image forming apparatus 3A by detecting its orientation with the use of a geomagnetic sensor or the like.

When a plurality of in-authentication-distance terminals 5a and 5b exist, the terminal determining section 33A specifies, based on the apparatus orientation information, a portable terminal 5a or 5b that is located at a position at which an operation input to the image forming apparatus 3A is possible. In Example 2, the terminal determining section 33A specifies the portable terminals 5a or 5b that is located in front of the image forming apparatus 3A, for example.

Figure 7:
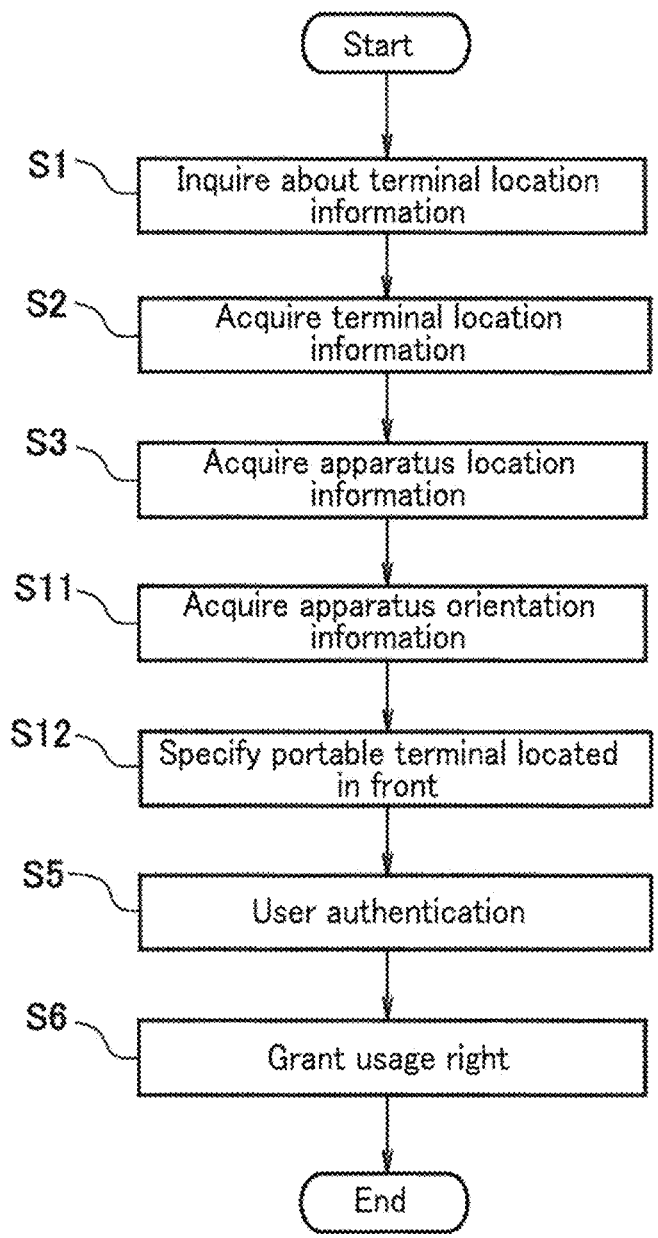
FIG. 7 shows a flow of an authentication process according to Example 2.

FIG. 7 shows a flow of the authentication process according to Example 2.

The authentication process according to Example 2 is common with the authentication process according to Example 1 with respect to the processing performed in Steps S1-S3, S5, and S6. In the authentication process according to Example 2, Steps S11 and S12 are performed after Steps S1-S3.

In Step S11, the controller 25A acquires the apparatus orientation information of the image forming apparatus 3A. In the processing of Step S11, the apparatus orientation information acquiring section 39 of the image forming apparatus 3A acquires the apparatus orientation information of the image forming apparatus 3A from the storage section 27.

In Step S12, the controller 25A specifies the portable terminal 5a or 5b located in front of the image forming apparatus 3A. In the processing of Step S12, first, the terminal determining section 33A of the image forming apparatus 3A determines one or more in-authentication-distance terminals. If a plurality of in-authentication-distance terminals exist, the terminal determining section 33A specifies the portable terminal 5a or 5b that is located in front of the image forming apparatus 3A, based on the apparatus orientation information and apparatus location information of the image forming apparatus 3A and the terminal location information of the portable terminal 5a and 5b. Thereafter, the image forming apparatus 3A determines that the user of the specified portable terminal 5a or 5b is the current user, and performs the processing of Steps S5 and S6.

In Example 2, even if a plurality of in-authentication-distance terminals 5a and 5b exist, the image forming apparatus 3A can specify the portable terminal 5a or 5b of the user operating the image forming apparatus 3A. Consequently, the image forming apparatus 3A can more reliably permit the user to use the image forming apparatus 3A according to the appropriate usage right.

EXAMPLE 3

Figure 8:
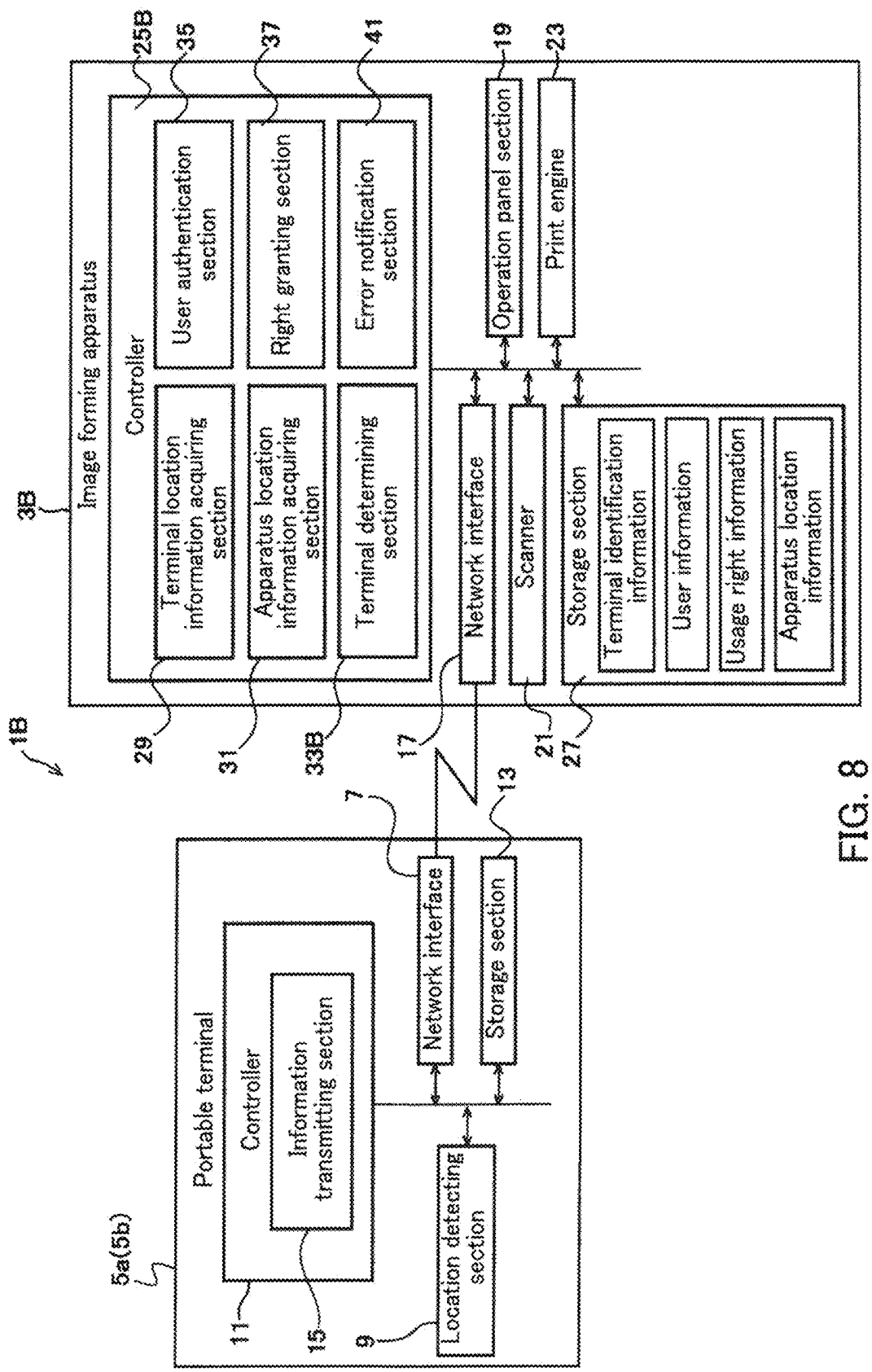
FIG. 8 shows a configuration of an authentication system according to Example 3.

FIG. 8 shows a configuration of an authentication system according to Example 3. In FIG. 8, component parts that are common with Example 1 are denoted by the same reference signs or those appended with the letter B. In addition, explanations of such common component parts are omitted where appropriate.

If a plurality of in-authentication-distance terminals 5a and 5b exist, an image forming apparatus 3B according to Example 3 notifies each in-authentication-distance terminal of an error. In Example 3, a controller 25B of the image forming apparatus 3B also functions as an error notification section 41. The error notification section 41 implements the function of notifying of an error and sends error information to each of the in-authentication-distance terminals 5a and 5b.

Figure 9:
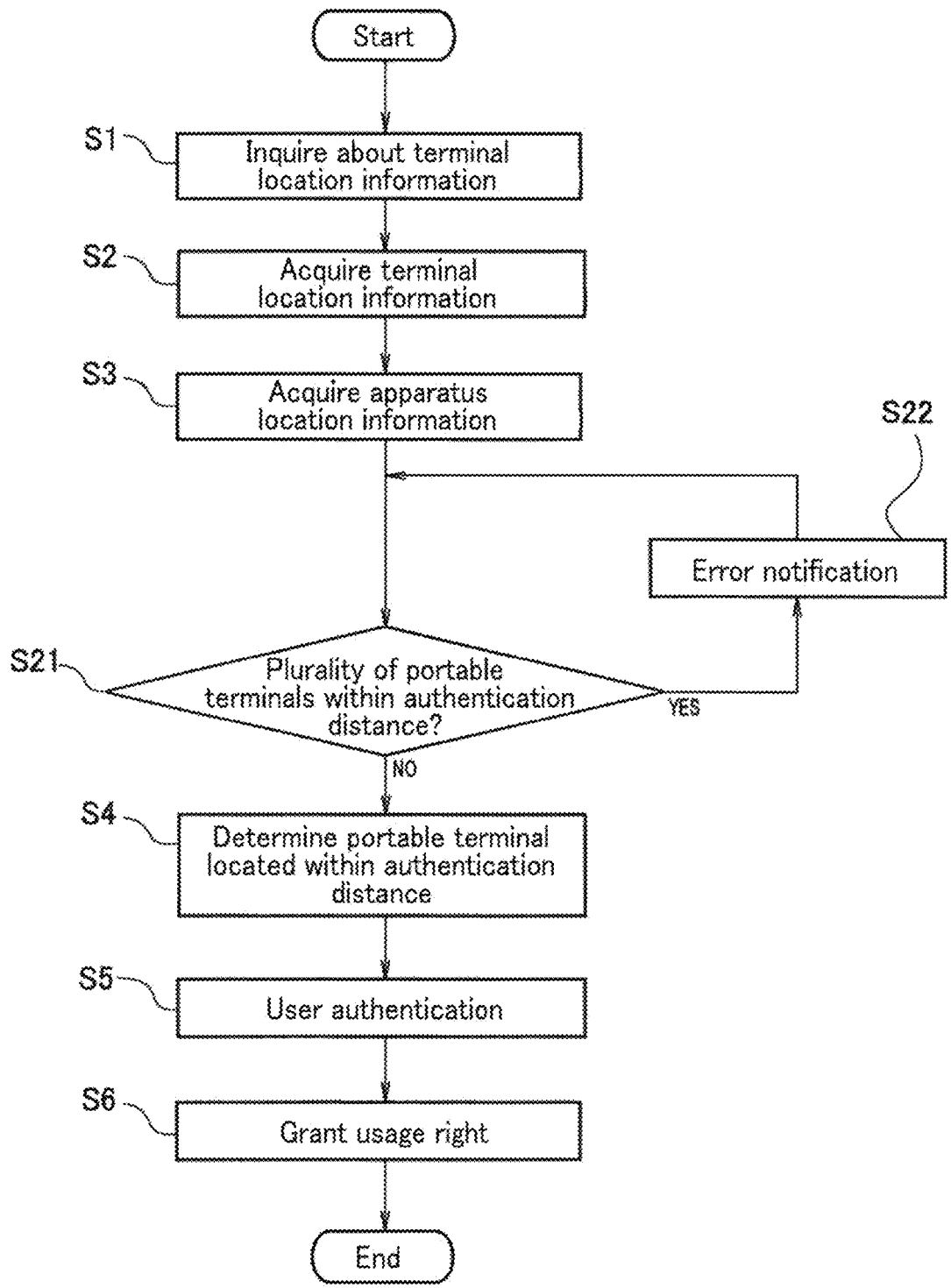
FIG. 9 shows a flow of an authentication process according to Example 3.

FIG. 9 shows a flow of the authentication process according to Example 3.

The authentication process according to Example 3 is common with the authentication process according to Example 1 with respect to the processing performed in Steps S1-S6. In the authentication process according to Example 3, Steps S21 and S22 are performed between Steps S3 and S4.

In Step S21, the controller 25B determines whether or not a plurality of in-authentication-distance terminals exist. In the processing of Step S21, a terminal determining section 33B of the image forming apparatus 3B determines whether or not a plurality of in-authentication-distance terminals 5a and 5b exist based on the acquired pieces of terminal location information of the portable terminal 5a and 5b and the acquired apparatus location information of the image forming apparatus 3B.

If a plurality of in-authentication-distance terminals 5a and 5b do not exist (Step S21: NO), the controller 25B moves the processing to Step S4.

On the other hand, if a plurality of in-authentication-distance terminals 5a and 5b exist (Step S21: YES), the controller 25B moves the processing to Step S22.

In Step S22, the controller notifies of an error. In the processing of Step S22, the error notification section 41 of the image forming apparatus 3B transmits error information to each of the in-authentication-distance terminals 5a and 5b. For example, the error information can include a message prompting the user not currently operating the image forming apparatus 3B to move to the outside the range of the authentication distance.

Thereafter, the controller 25B moves the processing back to Step S21. Note that the controller 25B may move the processing back to Step S21 after a specific time period, for example. This provides time allowing the user(s) not operating the image forming apparatus 3B to move to the outside the range of the authentication distance.

In Example 3, when a plurality of in-authentication-distance terminals 5a and 5b exist, the image forming apparatus 3B can notifies each in-authentication-distance terminal of an error. Consequently, the image forming apparatus 3B can prompt each user having no intention of operating the image forming apparatus 3B to move to the outside the range of the authentication distance, so that the portable terminal 5a or 5b owned by the current user can be reliably determined.

What is claimed is:

1. An authentication system comprising:
one or more portable terminals; and
an electronic device configured to perform user authentication, wherein
the electronic device includes
a storage section configured to store
authentication information of one or more users each associated with one of the one or more portable terminals,
usage right information indicating a usage right granted to each of the one or more users,
location information of the electronic device, and
orientation information indicating an orientation of the electronic device,
a terminal location information acquiring section configured to acquire location information of each of the one or more portable terminals,
a terminal determining section configured to determine from among the one or more portable terminals a first portable terminal that is located within a specific authentication distance from the electronic device, based on the location information of each of the one or more portable terminals and the location information of the electronic device,
a user authentication section configured to perform authentication of a first user associated with the first portable terminal, based on the authentication information of the first user,
a right granting section configured to permit the first user to use the electronic device within a scope of usage right granted to the first user,
an operation input section configured to receive an operation input, and
an error notification section configured to issue, if a plurality of the first portable terminals exist, an error notification to each of the first portable terminals repeatedly until there exists only one first portable terminal,
upon the operation input section receiving an operation input requiring user authentication, the terminal location information acquiring section performs the acquisition of the location information of each of the one or more portable terminals, and the terminal determining section performs the determination of the first portable terminal,
if a plurality of the first portable terminals exist, the terminal determining section specifies one first portable terminal that is located in front of the operation input section from among the plurality of first portable terminals, based on the orientation information, and
the user authentication section determines a user associated with the specified first portable terminal as the first user and performs the user authentication.

2. An authentication system comprising:
one or more portable terminals; and
an electronic device configured to perform user authentication, wherein
the electronic device includes
a storage section configured to store
authentication information of one or more users each associated with one of the one or more portable terminals,
usage right information indicating a usage right granted to each of the one or more users, and
location information of the electronic device a terminal location information acquiring section configured to acquire location information of each of the one or more portable terminals, a terminal determining section configured to determine from among the one or more portable terminals a first portable terminal that is located within a specific authentication distance from the electronic device, based on the location information of each of the one or more portable terminals and the location information of the electronic device, a user authentication section configured to perform authentication of a first user associated with the first portable terminal, based on the authentication information of the first user, a right granting section configured to permit the first user to use the electronic device within a scope of usage right granted to the first user, and an error notification section configured to issue, if a plurality of the first portable terminals exist, an error notification to each of the first portable terminals repeatedly until there exists only one first portable terminal, and if only one portable terminal is located within the specific authentication distance from the electronic device, the terminal determining section determines the portable terminal as the first portable terminal.

3. An authentication system according to claim 1, wherein the electronic device further includes a device location information acquiring section configured to acquire location information of the electronic device and stores the acquired location information of the electronic device to the storage section.

4. An authentication system according to claim 2, wherein the error notification includes error information, and the error information includes a message prompting a user not currently operating the electronic device to move to the outside a range of the authentication distance.

5. An electronic device comprising:

a storage section that store authentication information of one or more users each associated with one of one or more portable terminals, usage right information indicating a usage right granted to each of the one or more users, location information of the electronic device, and orientation information indicating an orientation of the electronic device;

a terminal location information acquiring section configured to acquire location information of each of the one or more portable terminals;

a terminal determining section configured to determine from among the one or more portable terminals a first portable terminal that is located within a specific authentication distance from the electronic device, based on the location information of each of the one or more portable terminals and the location information of the electronic device;

a user authentication section configured to perform authentication of a first user associated with the first portable terminal, based on the authentication information of the first user;

a right granting section configured to permit the first user to use the electronic device within a scope of usage right granted to the first user;

an operation input section configured to receive an operation input; and an error notification section configured to issue, if a plurality of the first portable terminals exist, an error notification to each of the first portable terminals, wherein upon the operation input section receiving an operation input requiring user authentication, the terminal location information acquiring section performs the acquisition of the location information of each of the one or more portable terminals, and the terminal determining section performs the determination of the first portable terminal, if a plurality of the first portable terminals exist, the terminal determining section specifies one or more first portable terminals that are located in front of the operation input section from among the plurality of first portable terminals, based on the orientation information, the error notification section configured to issue, if a plurality of the first portable terminals exist, an error notification to each of the first portable terminals repeatedly until there exists only one first portable terminal, if only one portable terminal is located within the specific authentication distance from the electronic device, the terminal determining section determines the portable terminal as the first portable terminal, and the user authentication section determines a user associated with the determined first portable terminal as the first user and performs the user authentication.

6. An electronic device according to claim 5, wherein the error notification includes error information, and the error information includes a message prompting a user not currently operating the electronic device to move to the outside a range of the authentication distance.

* * * * *